United States Patent
Javaux

[15] 3,652,252
[45] Mar. 28, 1972

[54] TANK FURNACE FOR THE TREATMENT OF GLASS BY THE FLOAT PROCESS

[72] Inventor: Gustave Javaux, Brussels, Belgium
[73] Assignee: Glaverbel, Watermael-Boitsfort, Belgium
[22] Filed: Oct. 3, 1969
[21] Appl. No.: 863,517

[30] Foreign Application Priority Data

Sept. 5, 1969 Great Britain.....................44,043/69

[52] U.S. Cl............................65/182 R, 65/99 A, 65/374
[51] Int. Cl. .......................................................C03b 18/02
[58] Field of Search..............................65/99 A, 182 R, 374

[56] References Cited

UNITED STATES PATENTS 3,127,261  3/1964  Long...................................65/182 X
3,326,652  6/1967  Plumat................................65/182 X
3,348,937  10/1967 Plumat................................65/99 X
3,503,728  3/1970  Itakura...............................65/182
3,520,669  7/1970  Greenler et al. .....................65/182 X Primary Examiner—Arthur D. Kellogg
Attorney—Edmund M. Jaskiewicz

[57] ABSTRACT

A furnace for the treatment of glass has a tank of refractory material containing a bath of molten material upon which the glass is floated. The refractory material has a property of releasing a vitreous phase lighter than the molten material at operating temperatures of the furnace. Metallic screen means comprising a plurality of spaced or overlapping slid metal plates which may be of tungsten or tungsten alloys or positioned between the refractory material and the upper surface of the bath to prevent the vitreous phase from reaching this surface of the bath.

7 Claims, 6 Drawing Figures

PATENTED MAR 28 1972 3,652,252

TANK FURNACE FOR THE TREATMENT OF GLASS BY THE FLOAT PROCESS

The present invention relates to the production or treatment of glass floating on a bath of molten material in a tank furnace, more particularly, to the structure of the refractory floor of the tank furnace.

A tank furnace may be used in the production of flat glass by the float process and also for many treatment processes which may comprise shaping of a cast mass of glass into the form of a ribbon or strip as well as the modification of the geometrical, physical and/or chemical properties of a glass ribbon or of glass pieces. Such tank furnaces are generally made of refractory material having the property of releasing a vitreous phase which is lighter than the molten material in the tank furnace at the temperatures encountered during operation. The vitreous phase may have a sufficiently low viscosity to form a drop which rises within the molten material to reach the upper surface of the bath. When a glass ribbon is floating on the upper surface of the bath the drop of vitreous phase is carried away by the glass moving over the bath. As a result of this movement the drop drags behind it a very long fiber of the vitreous phase which deteriorates a considerable quantity of the glass ribbon.

It is therefore the principal object of the present invention to provide a structure and process for preventing drops of vitreous phase released from the furnace refractory walls from reaching the upper surface of a bath of molten material.

The present invention is particularly applicable to a furnace for the production or treatment of glass floating on a bath of molten material contained within a tank. The tank is formed of a refractory material having the property of releasing a vitreous phase lighter than the molten bath at operating temperatures of the furnace. According to the present invention there may be provided one or more solid metal plates interposed between at least a portion of the refractory elements of the tank and the upper surface of the bath in order to prevent the vitreous phase from reaching the upper surface of the bath. The metal plates form a metallic screen means and may be spaced apart a very small distance which is insufficient to permit the passage of the vitreous phase. Successive plates may have their edges overlapping and a joint pervious to gas and impervious to the molten material may be formed between these edges. The joint may comprise at least one material having surface tension effects which prevent the passage of molten material through the narrow paths existing within the joint. At least the surface portion of such a joint may consist essentially of carbon powder. The metallic screening means may be positioned along the bottom or along other walls of the tank and may comprise a metal layer on the refractory elements or a layer of refractory slabs carrying a metal plate or coating.

The metallic members may be placed in the region of the tank furnace which is not occupied by the glass under treatment. In this event the present invention will significantly decrease any pollution of the upper surface of the bath by drops of floating vitreous material.

The metallic plates may be of tungsten or a tungsten alloy and may be positioned on the refractory material or fastened to the refractory block walls.

According to the present invention the process may be applied to the treatment of glass floating on a bath of molten material contained in a tank comprising refractory members having the property of releasing vitreous phase which is lighter than the molten material of the bath at the temperatures reached during operation of the process and at least a portion of the molten material is protected against penetration by the vitreous phase by solid metal screen means.

Other objects and advantages of the present invention will be apparent in the following description when taken in conjunction with the following drawings, which are exemplary, wherein.

Proceeding next to the drawings wherein like reference symbols indicate the same parts throughout the various views a specific embodiment and modifications of the present invention will be described in detail.

Figure 1:
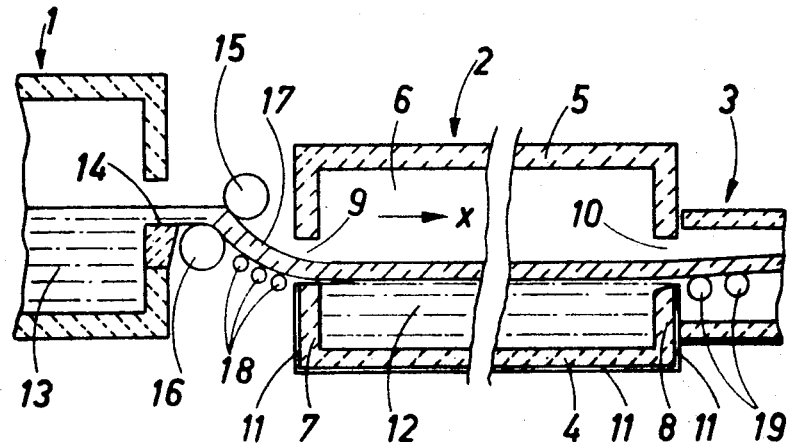
FIG. 1 is a longitudinal vertical sectional view of a float tank furnace embodying the present invention.

In the "float" line illustrated in FIG. 1, there is shown a melting furnace 1, a float tank 2 and an annealing lehr 3. The float tank 2 comprises a bottom floor 4, a crown 5, side wall 6 and end walls 7, 8 which are spaced from the crown 5 by slots 9 and 10. These components of the float tank are made of refractory materials. A metallic wall 11 hermetically encloses the tank defined by the bottom 4, the side wall 6 and end walls 7, 8 for containing a bath of molten material 12. The bath may be a molten metal such as tin or silver or a molten metal salt such as known mixtures of potassium, sodium or lithium salts.

The melting furnace 1 contains a bath of molten glass 13 from which molten glass is flowed over a casting lip 14 through rollers 15 and 16 which form a glass ribbon 17. The ribbon 17 is conveyed by transport rolls 18 through the slot 9 of the float tank onto the bath 12 and moves in the direction indicated by arrow X. The glass ribbon 17 is fire polished on the bath 12 as it moves thereon and is then discharged through slot 10 over transport rolls 19 to be conveyed to the annealing lehr 3.

Figure 2:
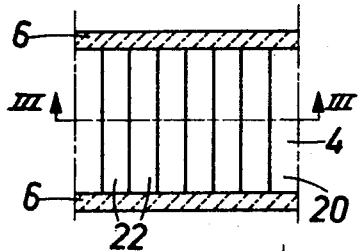
FIG. 2 is a horizontal sectional view of a portion of the float tank of FIG. 1 showing in plan the bottom of the tank.
Figure 3:
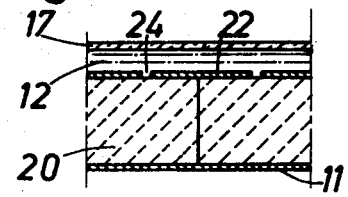
FIG. 3 is a sectional view taken along the line III—III of FIG. 2 but in enlarged scale.

As may be seen in FIGS. 2 and 3 the refractory tank bottom 4 is formed of the steel sheet 11 upon which are positioned rows of silica-clay refractory blocks 20 which are known in the art and are suitably fastened to metal sheet 11. Positioned on the inner surfaces of the refractory blocks 20 is a metallic screen means comprising a plurality of tungsten strips or plates 22 disposed transversely between the side walls 6 of the tank. To facilitate the installation and to obtain reliable service over long periods of time it is preferred that the plates have a thickness ranging from 0.5 to 10 mm. The plates are completely or substantially made of tungsten at least along those surfaces which are contact with the molten material 12. It has been discovered that tungsten, either pure or as the principal constitute of an alloy, is particularly suitable for resisting the different molten materials such as may be used in the float furnace of the present invention. Tungsten is also suitable for any fastening means which may be used for securing the plates to the refractory walls.

The plates 22 are separated by spaces 24 which are of the order of 1 to 2mm. and are preferably not positioned at the joints between adjacent refractory blocks 20. The spaces between the plates should be insufficient for the passage of the vitreous phase released from the refractory material under working conditions of the tank furnace. This is particularly true when the metal from which the plates are made has a thermal conductivity which is considerably different from that of the molten material. The space between the plates permits considerable reduction of heat transfer by conduction in one or more directions along the surface defined by all of the plates.

During the operation of the tank furnace 2, the molten tin bath 12 which supports the glass ribbon 17 will be upon the plates 22. The plates may be located along the entire length of the furnace floor. However, depending upon quality of the refractory material in the refractory blocks in the tank bottom, the plates 22 may be used only in the highest temperature regions of the tank bottom which would be in the upstream portion of the furnace closer to entrance slot 9. By way of example, the temperature above which such tungsten strips may be used may be about 850° C. for selected refractory block material.

It is preferable that the transversely extending strips 22 be so arranged that heat transfer through the metal of these strips is achieved preferably transversely of the tank. Longitudinal heat transfer which is generally less desirable is reduced because of the presence of the joints or spaces 24 which reduce the heat flow.

Forming of the metallic screen means with a plurality of spaced plates is relatively simple since the plates are easily handled and positioned on the refractory floor. The plates can be merely placed on the floor if their density is greater than that of the molten material beneath the plates. The plates can also be fastened to the refractory block walls, but regardless of their density fastening members can be used which are secured to the plates themselves and which are inserted into the joints between the refractory blocks and then folded back beneath the blocks.

Figure 4:
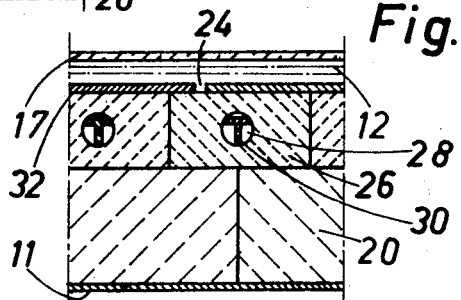
FIG. 4 is a view similar to that of FIG. 3 and showing a modified structure for the tank bottom floor.

In the tank floor as illustrated in FIG. 4, a layer of blocks 26 made of a refractory material having good thermal conductivity is positioned on a layer of silica-clay insulating refractory blocks 20. The blocks 26 are provided with through passages 28 which are positioned transversely with respect to the tank furnace floor. Metallic structural members 30 of various cross sectional configurations pass through the passages 28 and are anchored at their ends to supporting structure of the furnace. In the duct or passageway formed by a number of aligned passages 30 in a transverse row of blocks, a thermal conditioning fluid may be circulated for either heating or cooling purposes. The metallic screen means which comprises a plurality of square tungsten plates 32 separated by joints 24 is located beneath the glass ribbon 17 in that portion of the tank in which the refractory blocks 26 will reach sufficiently high temperatures to release a vitreous phase when in contact with the bath of molten material 12. The transverse temperature gradient may be controlled to a desired pattern, and easily maintained constant, by differential thermal conditioning means positioned over the lengths of the passageways 28 but not shown in the drawings.

Figure 5:
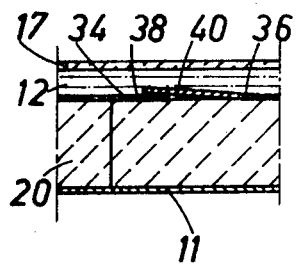
FIGS. 5 and 6 are views similar to that of FIG. 3 and showing other forms of the tank floor embodying the present invention.

In FIG. 5, the tungsten plates 34 and 36 have their adjacent edges overlapping for several centimeters in the marginal areas indicated at 38. This overlapping may occur longitudinally or transversely or in both directions. The edges of successive plates overlap so that the plates are in substantial contact with each other and thus provide sufficient thermal transmission between successive plates. In addition, this overlapping arrangement reduces the possibility of molten material passing through the joints between adjacent plates. Where it is desired to have a tight seal between overlapping plates a joint may be made of carbon powder. Such a joint will be pervious to gas but impervious to the molten material and is formed, at least partially, by at least one material whose surface tension effects will prevent the passage of molten material through the narrow passages which may exist in the joint.

The joint in FIG. 5 may be formed by using either carbon powder or a casting of carbon powder or other materials containing substantial quantities of carbon in the combined state and capable of forming carbon powder and evolving gases when subjected to an initial heating action. A joint may be formed in a space 40 located beneath the plate 36 adjacent the edge of underlying plate 34. The joint may also be formed between the overlapping edges 38 of the successive plates or may be formed in both locations 38 and 40. The tin bath 12 cannot flow through the narrow paths existing between the powder grains in areas 38 and/or 40. The refractory blocks 20 will thus not be in contact with the molten tin and they are not fastened onto sheet 11. Horizontal heat transfer is accomplished primarily by the molten tin bath 12 but also by the overlapping plates 34 and 36. The overlapping of successive plates in marginal areas 38 results in favorably influencing heat transfer. It has also been found that it was preferable not to use carbon powder in the area 38 when it is desired to have maximum heat transfer.

Figure 6:
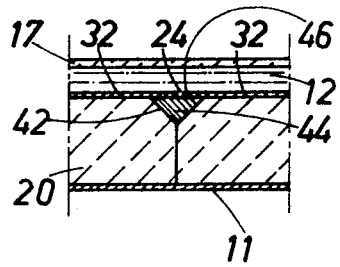

In FIG. 6 there is shown another form of joint between adjacent plates forming the metallic screen means in the bottom of the tank. Adjacent plates 32 are separated by a joint or space 24 with a sealing joint being positioned beneath the space. The upper edges of refractory blocks 20 are cut on an angle to form oblique or slanting faces 42 within which a material 44, such as carbon which is capable of forming a joint between the edges 46 of the plates 32, has been positioned. A satisfactory joint can be formed either by carbon or with a carbon block cut in the form of a prism to conform to the shape of the space 44 or by filling the space 44 with several contiguous strips of carbon. A tight seal is thus obtained between the plate edges 46 provided that there is not excessive spacing in the joint between the carbon elements as well as between carbon elements and plate edges 46. A space of about 1 mm. between adjacent carbon elements will be acceptable without risking any penetration of molten tin through the joint. The joint of FIG. 6 thus, in effect, constitutes a bridge providing a tight seal between marginal zones for areas of the plates with these zones being adjacent to the edges of the plates. Because of surface tension, it is possible to maintain a tight seal in spite of the opening of the passages and in spite of any relative movement of the elements forming these narrow passages through the seal. Such movement may occur under the effect of thermal dilation. Since the metallic screens are generally considerably larger than the usual blocks of refractory material the number of such tight joints which would be made is smaller. These tight joints eliminate any passage of the molten material beneath the refractory blocks forming the floor of the tank. Therefore it may no longer be necessary to anchor these refractory blocks even if the refractory material of the blocks has a density lower than that of the molten material.

The sealing joints of FIGS. 5 and 6 may be formed of a powder the particles of which are substantially of carbon at least on the surface in contact with the molten material. Carbon is not wetted by most of the molten materials which are used in such tank furnaces. The use of powder is particularly advantageous because the joints between the particles do not vary even if the entire joint should open up even considerably under the effect of thermal dilation. A binder may be used with the powder in order to facilitate its application. A binder can have the property of disappearing upon the initial heating of the tank furnace.

Where the joint of FIG. 6 is formed with number of carbon elements a tight seal is obtained between these elements because of the short distances between them and because of the effects of the surface tension.

When tungsten plates according to the present invention are used with a molten tin bath the thickness of the bath may range from 10–50 mms. Where the bath is a molten salt, such as a known mixture of potassium, sodium or lithium salts, the metallic screen members may be made of molybdenum or stainless refractory steel, both of which have the property of withstanding contact with such baths of molten salts.

It will be understood that this invention is susceptible to modification in order to adapt it to different usages and conditions.

What is claimed is:

1. In a furnace for the treatment of glass floating on a tank of refractory materials which is adapted to contain a bath of molten tin and wherein at least one of said refractory materials has the property of releasing a vitreous phase lighter than the bath of molten tin at operating temperatures of the furnace and tending to rise within the molten bath to the upper surface of the bath, the improvement comprising disposing metallic screen means between at least a portion of said refractory material and the said upper surface of the bath of molten tin, the said metallic screen means comprising a plurality of metal screen plates consisting principally of tungsten and which plates are positioned relatively close to each other so that the space between adjacent tungsten screen plates is insufficient for the passage of said vitreous phase through the screen means and into the molten material during operation of the furnace.

2. In a furnace as claimed in claim 1 wherein said plates have their lengths extending transversely to the direction of movement of the glass through the furnace.

3. In a furnace as claimed in claim 1 wherein an edge of one plate overlaps the adjacent edge of the next plate and being substantially in contact therewith.

4. In a furnace as claimed in claim 1 wherein said metallic screen means comprises a plurality of plates, and means between adjacent edges of successive plates for defining a joint pervious to gas and impervious to said vitreous phase.

5. In a furnace as claimed in claim 4 wherein said joint comprises at least one material having surface tension effects which prevent the passage of said vitreous through the narrow paths existing within the joint.

6. In a furnace as claimed in claim 5 wherein at least the surface portion of said joint comprises a powder consisting essentially of carbon.

7. In a furnace as claimed in claim 4 wherein said joint comprises a member disposed in the immediate proximity of said adjacent edges and consisting essentially of carbon at least in the face thereof adjacent said edges.

* * * * *